United States Patent
Sahoo et al.

(10) Patent No.: US 11,424,640 B2
(45) Date of Patent: Aug. 23, 2022

(54) INTEGRATED HIGH-VOLTAGE-LOW-VOLTAGE DC-DC CONVERTER AND CHARGER WITH ACTIVE FILTER

(71) Applicant: Apple Inc., Cupertino, CA (US)

(72) Inventors: Ashish K. Sahoo, San Jose, CA (US); Brandon Pierquet, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 111 days.

(21) Appl. No.: 17/032,656

(22) Filed: Sep. 25, 2020

(65) Prior Publication Data
US 2022/0103003 A1 Mar. 31, 2022

(51) Int. Cl.
| | |
|---|---|
| *B60L 53/20* | (2019.01) |
| *H02J 7/06* | (2006.01) |
| *H02J 7/34* | (2006.01) |
| *H02M 3/335* | (2006.01) |
| *B60L 50/60* | (2019.01) |
| *H02M 1/12* | (2006.01) |
| *B60L 53/50* | (2019.01) |

(52) U.S. Cl.
CPC .............. *H02J 7/06* (2013.01); *B60L 50/60* (2019.02); *B60L 53/20* (2019.02); *H02J 7/342* (2020.01); *H02M 1/12* (2013.01); *H02M 3/33576* (2013.01); *B60L 53/50* (2019.02); *B60L 2210/10* (2013.01); *H02J 2207/20* (2020.01)

(58) Field of Classification Search
CPC ...................................................... B60L 53/20
USPC ...................................................... 320/103
See application file for complete search history.

(56) References Cited

U.S. PATENT DOCUMENTS

| | | | |
|---|---|---|---|
| 9,758,047 B2 * | 9/2017 | Hou | B60L 53/20 |
| 10,063,077 B2 | 8/2018 | Solodovnik et al. | |
| 10,536,092 B1 * | 1/2020 | Sahoo | H03D 7/125 |
| 11,021,069 B1 * | 6/2021 | Elshaer | B60L 50/60 |
| 2018/0222333 A1 | 8/2018 | Khaligh et al. | |

* cited by examiner

*Primary Examiner* — Jerry D Robbins
(74) *Attorney, Agent, or Firm* — Fletcher Yoder PC (57) ABSTRACT

A high voltage battery system can receive power from an AC grid and deliver power to a low voltage battery system. Embodiments can include an active filter and high voltage to low voltage (HVLV) DCDC converter to reduce harmonics associated with the charger reaching the low voltage battery system and further to stabilize the voltage presented to the HVLV DCDC converter to improve its operating efficiency.

22 Claims, 5 Drawing Sheets

INTEGRATED HIGH-VOLTAGE-LOW-VOLTAGE DC-DC CONVERTER AND CHARGER WITH ACTIVE FILTER

BACKGROUND

There has recently been increased proliferation of high voltage battery systems. Such systems may find applications in hybrid and fully electric vehicles, solar power systems, electrical grid storage systems, and the like. In each of these applications, the high voltage battery system may be charged by connecting to the AC power grid. In the case of fully electric vehicles, such connections may be present only when the vehicle is parked and a charger is available. In the case of hybrid electric vehicles an AC generator may be available whenever the internal combustion engine is running or when parked and connected to a charger, as with plug in hybrid electric vehicles (PHEVs). In the case of solar systems, grid batteries, and other applications an AC power source may always or nearly always available.

In at least some of the foregoing applications, it may be desirable to provide a single stage charger, which converts AC power received from an AC power source (such as the power grid) and into a DC voltage suitable for charging the battery. One potential disadvantage of such arrangements is the coupling of harmonics of the AC voltage (current) into the battery system. This disadvantage may be addressed by including suitable filter circuits, including active filter circuits, that can reduce this harmonic coupling. Likewise, in at least some of the foregoing applications, it may be desirable to have one or more low voltage systems that can be powered by the high voltage battery system. For example, in automotive applications, the electrical drive system may be powered by the high voltage system, while the remainder of the vehicle's electrical systems, including, climate control, infotainment, etc., may be powered by the lower voltage system. In such embodiments, a DC-DC converter may be provided to reduce the voltage of the high voltage system to a lower voltage suitable for the lower voltage systems.

SUMMARY

For applications in which it is desirable to provide both active filtering and high voltage to low voltage DC-DC (HV-LV-DC-DC) the device count and circuit complexity may increase to undesirable levels. For at least some of these applications, it may therefore be desirable to provide an integrated active filter and HVLVDCDC converter as shown and described herein.

A high voltage battery system can include a charger circuit, which can include an input switching bridge having an input and an output, the input configured to be coupled to an AC input source, the first switching bridge being further configured to convert an AC input voltage to an AC voltage having a selected voltage and frequency; a first transformer having a primary winding coupled to the output of the input switching bridge and a secondary winding; and a first rectifier charger circuit having an input coupled to the secondary winding of the first transformer and an output coupled to the high voltage DC bus. The high voltage battery system can further include a high voltage battery coupled to an output of the charger circuit. The high voltage battery system can further include an active filter circuit comprising a filter switching bridge and a filter circuit, having an input coupled to the output of the charger circuit and an output, the active filter circuit being operable to reduce harmonics associated with operation of the charger circuit and to provide a filtered DC voltage output. The high voltage battery system can also include a high voltage to low voltage DC-DC converter circuit including: an inverter having an input configured to be coupled to the output of the active filter circuit and an output, the inverter being further configured to convert a received filtered high DC voltage to an AC voltage having a selected voltage and frequency; a second transformer having a primary winding coupled to the output of the inverter and a secondary winding; and a second rectifier charger circuit having an input coupled to the secondary winding of the second transformer and an output coupled to the low voltage DC bus and being configured to produce a low DC voltage for a low DC voltage bus of the high voltage battery system. At least one of the first switching bridge and the first rectifier charger circuit can include a stacked half bridge. The filter switching bridge can include a stacked half bridge. The filter circuit can be a second order low pass filter.

A high voltage battery system can include a charger circuit, the charger circuit including: an input switching bridge having an input and an output, the input configured to be coupled to an AC input source, the first switching bridge being further configured to convert an AC input voltage to an AC voltage having a selected voltage and frequency; a first transformer having a primary winding coupled to the output of the input switching bridge and a secondary winding; and a first rectifier charger circuit having an input coupled to the secondary winding of the first transformer and an output coupled to the high voltage DC bus. The high voltage battery system can further include an active filter circuit comprising a filter switching bridge and a filter circuit, the active filter circuit having an input coupled to the output of the charger circuit and an output coupled to a high voltage DC bus, wherein the active filter circuit is operable to reduce harmonics associated with operation of the charger circuit and to provide a filtered DC voltage output. The high voltage battery system can also include a high voltage battery coupled to the high voltage DC bus. The high voltage battery system can also include a high voltage to low voltage DC-DC converter circuit, which can include: an inverter coupled to the active filter circuit and an output, the inverter being further configured to convert a high DC voltage to an AC voltage having a selected voltage and frequency; a second transformer having a primary winding coupled to the output of the inverter and a secondary winding; and a second rectifier charger circuit having an input coupled to the secondary winding of the second transformer and an output coupled to the low voltage DC bus and being configured to produce a low DC voltage for a low DC voltage bus of the high voltage battery system. At least one of the first switching bridge and the first rectifier charger circuit can include a stacked half bridge. The filter switching bridge can include a stacked half bridge. The filter circuit can include a second order low pass filter.

A high voltage battery system can include: a charger circuit having an input configured to receive power from an AC input source and an output coupled to a high voltage DC bus configured to provide output DC power to a high voltage battery, wherein one or more switching converters of the charger circuit may be operable to convert the received power into the output DC power; an active filter circuit having an input coupled to the output of the charger circuit and an output, wherein the active filter circuit may be operable to reduce harmonics associated with operation of the charger circuit and to provide a filtered DC voltage output; and a high voltage to low voltage DC-DC converter circuit having an input coupled to the output of the active filter circuit and an output configured to be coupled to one or more low voltage loads, wherein the high voltage to low voltage DC-DC converter may be operable to convert a filtered DC voltage received from the active filter to a lower DC voltage provided to a low DC voltage bus. The charger circuit can include: an input switching bridge having an input configured to be coupled to the AC input source and an output, the first switching bridge being further configured to convert the received power to an AC voltage having a selected voltage and frequency; a first transformer having a primary winding coupled to the output of the input switching bridge and a secondary winding; and a first rectifier charger circuit having an input coupled to the secondary winding of the first transformer and an output coupled to the high voltage DC bus. At least one of the first switching bridge and the first rectifier charger circuit can include a stacked half bridge. The active filter circuit can The filter switching bridge can include a stacked half bridge. The filter circuit can be a second order low pass filter. The high voltage to low voltage DC-DC converter circuit can include: an inverter having an input configured to be coupled to the output of the active filter circuit and an output, the inverter being further configured to convert a received filtered high DC voltage to an AC voltage having a selected voltage and frequency; a second transformer having a primary winding coupled to the output of the inverter and a secondary winding; and a second rectifier charger circuit having an input coupled to the secondary winding of the second transformer and an output coupled to the low voltage DC bus.

A high voltage battery system can include: a charger circuit having an input configured to receive power from an AC input source and an output, wherein one or more switching converters of the charger circuit are operable to convert the received power into the output DC power; an active filter circuit having an input coupled to the output of the charger circuit and an output, wherein the active filter circuit is operable to reduce harmonics associated with operation of the charger circuit and to provide a filtered DC voltage output and wherein an output of the active filter circuit is coupled to a high voltage DC bus configured to provide output DC power to a high voltage battery; and a high voltage to low voltage DC-DC converter circuit having an input coupled to the active filter circuit and an output configured to be coupled to one or more low voltage loads, wherein the high voltage to low voltage DC-DC converter is operable to convert a DC voltage to a lower DC voltage provided to a low DC voltage bus. The charger circuit can include: an input switching bridge having an input configured to be coupled to the AC input source and an output, the first switching bridge being further configured to convert the received power to an AC voltage having a selected voltage and frequency; a first transformer having a primary winding coupled to the output of the input switching bridge and a secondary winding; and a first rectifier charger circuit having an input coupled to the secondary winding of the first transformer and an output coupled to the high voltage DC bus. At least one of the first switching bridge and the first rectifier charger circuit comprise a stacked half bridge. The active filter circuit can include a filter switching bridge and a filter circuit. The filter switching bridge can include a stacked half bridge. The filter circuit can include a second order low pass filter. The high voltage to low voltage DC-DC converter circuit can include: an inverter having an input configured to be coupled to the active filter circuit and an output, the inverter being further configured to convert a received DC voltage to an AC voltage having a selected voltage and frequency; a second transformer having a primary winding coupled to the output of the inverter and a secondary winding; and a second rectifier charger circuit having an input coupled to the secondary winding of the second transformer and an output coupled to the low voltage DC bus.

DETAILED DESCRIPTION

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

Figure 1:
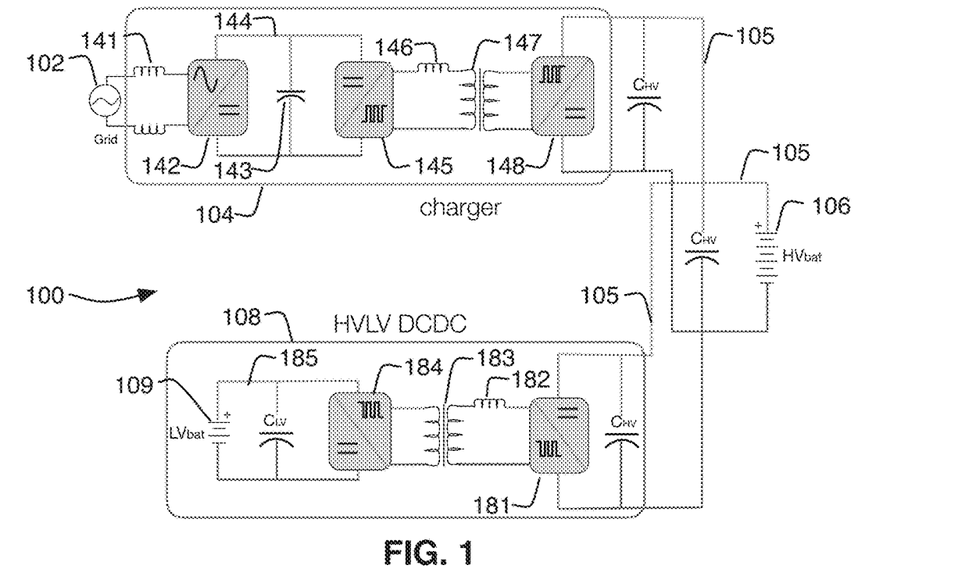
FIG. 1 illustrates a block diagram of a high voltage battery system that can receive power from an AC grid and deliver power to a low voltage battery system.

FIG. 1 illustrates a block diagram of a high voltage battery system 100 that can receive power from an AC source 102 (such as the electrical grid) and deliver power to a low voltage battery system 109. High voltage battery system 100 includes a high voltage battery 106. High voltage battery 106 may be charged from AC source 102 via a charger 104. Various embodiments of charger 104 are possible depending on the particular embodiment.

In the illustrated embodiment, charger 104 includes input filter 141, which may serve to minimize electromagnetic interference. Input filter 141 is illustrated as pair of inductors or chokes in series with the supplied AC voltage, but it will be appreciated that any of a variety of input filter arrangements are possible.

Charger 104 may also include a rectifier 142 that receives the AC input voltage and converts it to a DC voltage, which may be supplied to DC bus 144, which may be supported by capacitor(s) 143. Various rectifier topologies may be used, including half bridge and full bridge designs. Additionally, depending on the configuration of the input AC voltage, the rectifier may be a single phase, split phase, or polyphase (e.g., three phase) rectifier.

Depending on the configuration, a variety of rectifier devices may be used including diodes, silicon controlled rectifiers (SCRs) a/k/a thyristors, or transistors, including, for example, bipolar transistors, insulated gate bipolar transistors, field effect transistors such as junction field effect transistors (JFETs) or metal-oxide-semiconductor field effect transistors (MOSFETs), etc. In each of the embodiments discussed herein, MOSFETs are illustrated, although it is to be understood that other switching devices could be substituted as appropriate for a given embodiment. Additionally, the aforementioned semiconductor devices may be use any suitable semiconductor technology including silicon, silicon carbide (SiC), gallium nitride (GaN), etc. Depending on how high the "high voltage" is, SiC devices may be warranted. Additionally or alternatively, for higher power levels and/or higher switching frequencies, GaN devices may be preferred.

As noted above, the output DC voltage produced by rectifier 142 may appear across a DC bus 144, which may be supported by capacitor(s) 143. This DC voltage may further be provided to an inverter 145 that converts the DC voltage into an AC voltage that may be provided to transformer 147, which may include leakage inductance (or other series inductance 146). The Ac voltage produced by inverter 145 may have different voltage and/or frequency properties than the AC input voltage 102. As an example, using an inverter output voltage higher than the AC input voltage may allow for reduced current and therefore higher operating efficiency. As another example, using an inverter output frequency higher than the AC input frequency may allow for smaller magnetic components, such as transformer 147. As was the case with rectifier 142, various inverter topologies may be used, including half bridge and full bridge configurations configured as either single phase, split phase, or polyphase systems. Likewise, various switching devices using any suitable semiconductor technology may also be used.

Transformer 147 may receive the AC output voltage form inverter 147 and convert it into a high voltage that is in the general range of the high voltage battery 106. The degree of voltage conversion may be determined by the turns ratio of the transformer. For example, transformer 147 may convert the inverter output voltage to a level that is slightly above the full charge voltage of high voltage battery 106, so that charger 148 (discussed in greater detail below) may operate as a step-down converter. As another example, transformer 147 may convert the inverter output voltage to a level that is approximately equal to the full discharge voltage of high voltage battery 106 so that charger 148 (discussed in greater detail below) may operate as a step up converter. As still another example, transformer 147 may be a 1:1 transformer, in which case it serves only to provide galvanic isolation between high voltage battery 106 (and the associated systems) and the AC grid. Galvanic isolation is provided regardless of the transformer turns ratio (unless an autotransformer configuration is used).

As alluded to above, charger 148 may be a switching converter that converts the AC voltage on the secondary side of transformer 147 into a voltage suitable for high voltage battery 106. In some embodiments, this voltage may be the charging target voltage of the battery. Thus, when the battery is substantially discharged, and is at a relatively lower voltage (but still a "high voltage" for the purposes herein), charger 148 may produce a relatively low output voltage to regulate the charging current delivered to high voltage battery 106. Alternatively, when the battery is substantially charged, and is therefore at a relatively higher voltage, charger 148 may produce a relatively higher output voltage to charge the battery at a relatively slower rate. As with rectifier 142 and inverter 145 discussed above, charger 148 may have a variety of configurations (i.e., full bridge, half bridge, single phase, polyphase, etc.) and may be constructed from semiconductor switching devices of any suitable type or semiconductor technology. In any case, the output voltage of charger 148 may be provided to a high voltage bus 105 that is provided to high voltage battery 106 as well as to high voltage DC to low voltage DC to DC (HVLV DCDC) converter 108, which is discussed in greater detail below. High voltage bus may be supported by one or more capacitors CHV as illustrated. Finally, one or more high voltage loads (not shown) may be coupled to high voltage battery 106 and/or high voltage bus 105.

HVLV DCDC converter 108 may be employed to convert the high voltage appearing on high voltage bus 105 to a lower level suitable for a low voltage power system, illustrated as low voltage battery 109. In some embodiments, there may be additional or alternative loads appearing on the low voltage bus (i.e., bus 185), which may be supported by low voltage battery 109 and/or capacitor CLV. These additional or alternative loads are omitted here for sake of clarity. HVLV DCDC converter 108 may include an inverter 181 that converts the DC voltage of high voltage DC bus 105 into an AC voltage that may be applied to the input of transformer 183 (which may also include leakage or other series inductance 182). As above, inverter 181 may be constructed in a variety of configurations and using a variety of semiconductor devices and technologies. Transformer 183 may be configured to step down the rectified high DC voltage to a voltage more suitable for the low voltage bus 185. Transformer 183 may also serve to provide galvanic isolation between the low voltage system and high voltage bus 105/battery 106.

The AC voltage appearing at the secondary of transformer 183 may be provided to a rectifier 184 that may produce a suitable low voltage for low voltage bus 185 and low voltage battery 109. In some embodiments, rectifier/regulator 184 may be configured to produce a relatively constant low voltage DC bus voltage that is suitable for the attached low voltage loads. In other embodiments, rectifier regulator 184 may be configured to produce a variable DC voltage suitable for charging low voltage battery 109. In any case, rectifier/regulator 184 may be constructed using any suitable configuration, switch type, and semiconductor technology, including the examples discussed above with respect to various other converter stages.

Figure 2:
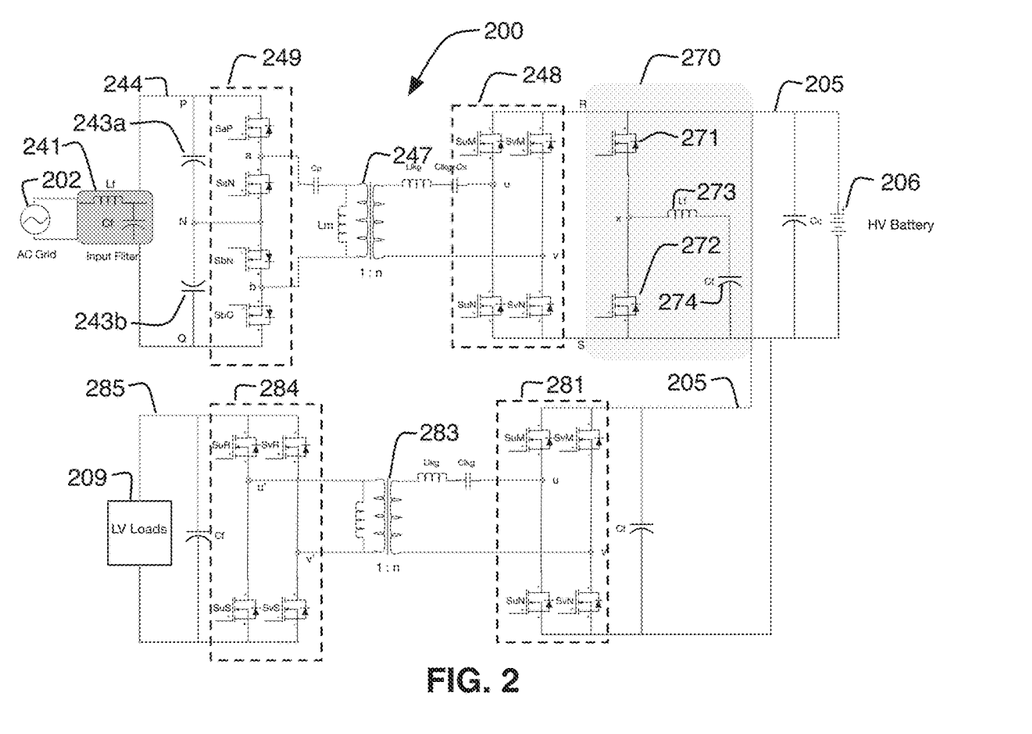
FIG. 2 illustrates a schematic of a high voltage battery system that can receive power from an AC grid and deliver power to a low voltage battery system incorporating an active filter to reduce harmonics associated with the charger reaching the low voltage battery system.

As noted above, in at least some embodiments, the arrangement described above can result in the undesirable coupling of AC grid harmonics into the high voltage bus 105 and thus to both high voltage battery 106 and the HVLV DCDC converter 108. Thus, FIG. 2 illustrates a schematic of a high voltage battery system 200 that can receive power from an AC grid 202 and deliver power to a low voltage battery system 209. The system includes an active filter 270 to reduce harmonics associated with the high voltage charger reaching the low voltage battery system. In FIG. 2, reference numerals that correspond to the same/similar devices in FIG. 1 are as an aid to understanding. As in FIG. 1, the system receives power from an AC source 202, such as the power grid. This input power may be filtered by an input filter 241. The resulting filtered voltage appears across an AC input bus 244, supported by input capacitors 243a and 243b.

Coupled to input bus 244 is a switching bridge 249, which in the illustrated embodiment is a stacked half bridge that effectively replaces both rectifier 142 and inverter 145 discussed above. Switching bridge 249 includes four switching devices SaP, SaN, SbN, and SbQ, with the inputs of the stacked half bridge (terminals P, N, and Q) coupled to DC bus 244 and the outputs (terminals a and b) coupled to transformer 247 (via blocking capacitor Cp). Operation of these switches selectively couples the AC voltage appearing at input terminals P, N, and Q to the output terminals a and b. Control of the switching frequency and/or duty cycle of these switches, using for example a pulse width modulation (PWM) control technique, can produce a controllable AC voltage at output terminals a and b. Switching bridge 249 thus takes the filtered AC input voltage appearing on bus 244 and converts it to an AC voltage that may have a different voltage and/or frequency. This converted voltage may then be applied to the primary winding transformer 247. As above, transformer 247 serves both to provide galvanic isolation between the AC input and the high voltage bus (discussed in greater detail below) as well as optionally providing either a step-up or step-down of the voltage. The AC voltage appearing across the secondary winding of transformer 247 may then be converted into a DC voltage by rectifier/charger 248.

In the illustrated embodiment, rectifier/charger 248 is a full bridge switching arrangement including switches SuM, SvM, SuN, and SvN. The inputs of the full bridge (terminals u and v) are coupled to the secondary winding of transformer 247. The outputs of the full bridge (terminals R and S) may then be coupled to an active filter 247, discussed in greater detail below. The outputs of rectifier/charger 248 are also coupled to high voltage bus 205, to which high voltage battery 206 is also coupled. As described above, rectifier/charger 248 may be operated to produce a target voltage for high voltage battery 206 so as to control charging of the battery. More specifically, operation of these switches selectively couples the AC voltage appearing at input terminals u and v to the output terminals R and S. Control of the switching frequency and/or duty cycle of these switches, using for example a pulse width modulation (PWM) control technique, can produce a controllable DC voltage at output terminals R and S. High voltage bus 205 may also optionally be supported by one or more capacitors Co. High voltage bus 205 may also be coupled to the HVLV DCDC converter as described in greater detail below.

The HVLV DCDC converter may include inverter 281, illustrated as a full bridge inverter made up of switching devices SuM, SvM, SuN, and SvN, with the input terminals coupled across high voltage bus 205 and the output terminals (u and v) coupled to the primary winding of transformer 283. These switching devices may be any suitable device type or semiconductor technology, as described above. Operation of these switches selectively couples the high voltage DC bus voltage on bus 205 to output terminals u and v. Control of the switching frequency and/or duty cycle of these switches, using for example a pulse width modulation (PWM) control technique, can produce an AC voltage having desired voltage and frequency characteristics at output terminals u and v. Inverter 281 may be thus operated to convert the high voltage DC bus voltage 205 into an AC voltage with voltage and frequency suitable for input into transformer 283.

As above, transformer 283 may serve to provide galvanic isolation between high voltage bus 205 and the low voltage battery system. Additionally, transformer may provide a desired degree of voltage conversion (e.g., step-down), depending on the turns ratio of the transformer. The voltage appearing at the secondary winding of transformer 283 may be coupled to the input terminals (u' and v') of rectifier/regulator 284. Rectifier/regulator 284 may be a full bridge made up of switching devices SuR, SuS, SvR, and SvS. These switching devices may be any suitable device type or semiconductor technology, as described above. Operation of these switches selectively couples the AC voltage appearing at input terminals u' and v' to the output terminals coupled to low voltage DC bus 285. Control of the switching frequency and/or duty cycle of these switches, using for example a pulse width modulation (PWM) control technique, can produce a controllable DC voltage on the low voltage DC bus. Rectifier/regulator 284 may thus be operated to convert the AC voltage appearing at the secondary of transformer 283 into a DC voltage suitable for low voltage DC bus 285, which may power one or more low voltage loads 209, including charging a low voltage battery.

As noted above, an active filter 270 may be provided. Active filter 270 may be configured and/or operated to minimize undesirable coupling of harmonics associated with the operation of charger stages 248/249 onto high voltage bus 205 and thereby into high voltage battery 206 and HVLV DCDC converter input stage 281. Active filter 270 may take a variety of configurations. In the illustrated embodiment, active filter 270 includes a half bridge made up of switches 271 and 272, with the half bridge coupled across the high voltage DC bus 205 (also the output terminals R and S of rectifier charger 248). These switching devices may be any suitable device type or semiconductor technology, as described above. The central node of the half bridge, i.e., terminal x, may be coupled to a low pass filter. Various filter configurations are possible. In the illustrated embodiment, the low pass filter is a $2^{nd}$ order low pass filter made up of filter inductor Lf, 273 and filter capacitor Cf, 274. By selective operation of switching devices 271 and 272, active filter 270 may be operated to minimize coupling of harmonics associated with switching of converters 248 and 249 onto high voltage DC bus 205.

Figure 3:
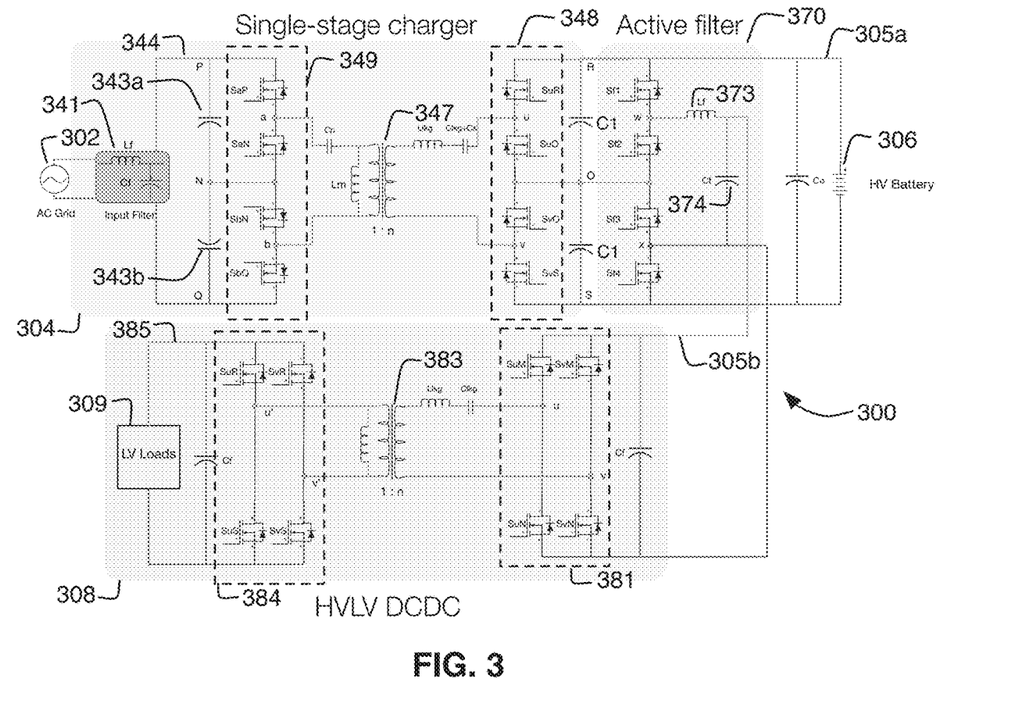
FIG. 3 illustrates a schematic of a first embodiment of a high voltage battery system that can receive power from an AC grid and deliver power to a low voltage battery system incorporating an integrated active filter and HVLV DCDC converter to reduce harmonics associated with the charger reaching the low voltage battery system.

As noted above, the addition of active filter 270 results in the inclusion of additional switching devices that increase the cost and complexity of the system. To that end, FIG. 3 illustrates a schematic of a first embodiment of a high voltage battery system 300 that can receive power from an AC grid and deliver power to a low voltage battery system incorporating an integrated active filter and HVLV DCDC converter to reduce harmonics associated with the charger reaching the low voltage battery system. High voltage battery system 300 includes a single stage charger 304 that receives AC input power, for example from an AC grid 302 and converts it to a high voltage DC that is supplied via high voltage DC bus 305a to a high voltage battery 306. Also coupled to high voltage bus 305a is an active filter 370, described in greater detail below. The output of active filter 370 may be provided to HVLV DCDC converter 308, which converts the filtered high DC voltage into a lower DC voltage suitable for low voltage loads 309.

Returning to charger 304, and similar to the systems described above, an AC voltage from an AC power source, such as an AC grid 302 may be passed through an input filter 341. This filtered AC voltage may appear across an AC input bus 344 (corresponding to terminals P, Q, and N). AC input bus 344 may be supported by capacitors 343a and 343b. This filtered AC input bus 344 is also connected to the input of a switching bridge 349. In the illustrated embodiment, switching bridge 349 is a stacked half bridge made up of four switches SaP, SaN, SbN, and SbQ. However, other switching bridge configurations could be used. Likewise, as with all converters described herein, different types of semiconductor devices based on different semiconductor technologies may be used depending on the particular application. Operation of these switches selectively couples the AC voltage appearing at input terminals P, N, and Q to the output terminals a and b. Control of the switching frequency and/or duty cycle of these switches, using for example a pulse width modulation (PWM) control technique, can produce a controllable DC voltage at output terminals a and b. Switching bridge 349 may thus be operated to convert the filtered AC input voltage appearing across AC input bus 344 to an AC voltage having different voltage and/or frequency characteristics at the output of switching bridge 349, i.e., terminals a and b. This voltage may be provided to the primary winding of transformer 347, which may provide galvanic isolation between the AC input and the DC voltage bus, as well as providing a suitable step up or step down of the voltage, depending on the turns ratio of the transformer.

As a result, a transformed AC voltage appears across the secondary winding of transformer 347. This voltage may be provided to the input terminals (u, v) of switching bridge 348, which may act as a rectifier/charger to produce the high voltage DC for DC bus 305a. In the illustrated embodiment, rectifier/charger 348 includes a stacked half bridge of switches SuR, SuO, SvO, and SvS. Operation of these switches selectively couples the AC voltage appearing at input terminals u and v to the output terminals R, 0, and S. Control of the switching frequency and/or duty cycle of these switches, using for example a pulse width modulation (PWM) control technique, can produce a controllable DC voltage at output terminals R, 0, and S. As with the other converter embodiments described herein, different topologies (e.g., bridge configurations), switching devices, and/or semiconductor technologies may be used as appropriate for a particular application.

The DC voltage appearing across high voltage DC bus 305a (corresponding to terminals R and S) may be provided to high voltage battery 306. Additionally, operation of switching bridge 348 may be used to control this DC voltage, to provide a suitable battery charging target voltage. As alluded to above, the operation of the preceding converter stages may produce undesirable harmonics of the AC grid frequency on this DC bus. Additionally, the changing voltage requirements of the battery throughout the charging cycle may cause the voltage appearing across high voltage bus 305a to vary substantially. This voltage variation may adversely impact the operating efficiency of the converters associated with the HVLV DCDC converter 308, discussed in greater detail below. To alleviate these issues, active filter 370 may be provided.

Active filter 370 includes a stacked half bridge of switches Sf1, Sf2, Sf3, and Sf4 coupled to a filter circuit made up of inductor Lf, 373 and capacitor Cf, 374. As with the other converters discussed herein, differing bridge configurations, switch types, and semiconductor technologies may be used as appropriate for a given application. The input of the switch bridge (terminals R, O, and S) are coupled to the high voltage DC bus 305a (and the neutral/common terminal O of rectifier charger 348, discussed above). The outputs of the switch bridge (terminals w and x are coupled to the filter circuit. The filter circuit is a $2^{nd}$ order low pass filter, as described above. Switches Sf1, Sf2, Sf3, and Sf4 may be operated to selectively couple the high voltage DC bus voltage to the filter circuit. By controlling the switching frequency and duty cycle of these switches, a controlled and filtered DC voltage may be delivered at the output of the filter circuit, forming filtered high voltage DC bus 305b, which is coupled to the input of HVLV DCDC converter 308.

HVLV DCDC converter 308 receives the filtered high voltage DC bus 305b and converts that high voltage to a low voltage suitable for low voltage loads 309. In the illustrated configuration, HVLV DCDC converter 308 may include inverter 381, illustrated as a full bridge inverter made up of switching devices SuM, SvM, SuN, and SvN, with the input terminals coupled across filtered high voltage bus 305b and the output terminals (u and v) coupled to the primary winding of transformer 383. These switching devices may be any suitable device type or semiconductor technology, as described above. Operation of these switches selectively couples the high voltage DC bus voltage on bus 305b to output terminals u and v. Control of the switching frequency and/or duty cycle of these switches, using for example a pulse width modulation (PWM) control technique, can produce an AC voltage having desired voltage and frequency characteristics at output terminals u and v. Inverter 381 may be thus operated to convert the filtered high voltage DC bus voltage 305b into an AC voltage with voltage and frequency suitable for input into transformer 383.

As above, transformer 383 may serve to provide galvanic isolation between high voltage bus 305b and the low voltage battery system. Additionally, transformer may provide a desired degree of voltage conversion (e.g., step-down), depending on the turns ratio of the transformer. The voltage appearing at the secondary winding of transformer 383 may be coupled to the input terminals (u' and v') of rectifier/regulator 384. Rectifier/regulator 384 may be a full bridge made up of switching devices SuR, SuS, SvR, and SvS. These switching devices may be any suitable device type or semiconductor technology, as described above. Operation of these switches selectively couples the AC voltage appearing at input terminals u' and v' to the output terminals coupled to low voltage DC bus 385. Control of the switching frequency and/or duty cycle of these switches, using for example a pulse width modulation (PWM) control technique, can produce a controllable DC voltage on the low voltage DC bus. Rectifier/regulator 384 may thus be operated to convert the AC voltage appearing at the secondary of transformer 383 into a DC voltage suitable for low voltage DC bus 385, which may power one or more low voltage loads 309, including charging a low voltage battery.

Figure 4A:
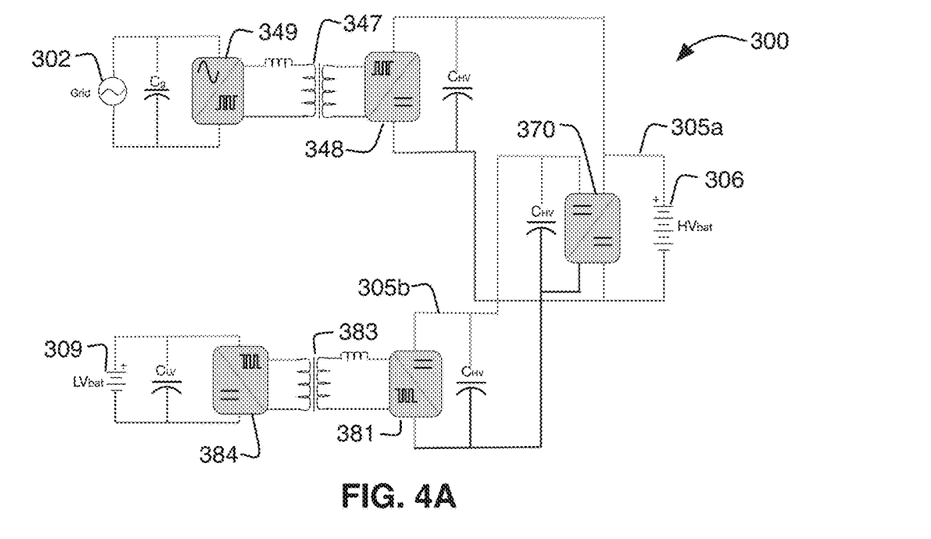
FIG. 4A illustrates a block diagram of the high voltage battery system of FIG. 3.

FIG. 4A illustrates a block diagram of the high voltage battery system 300 described above with respect to FIG. 3. Each of the converters/switching bridges has been replaced with a correspondingly numbered functional block. Notably, active filter 370 is denoted as a DC-DC converter. In all material respects, the connections and operation are as described above with respect to FIG. 3.

Figure 4B:
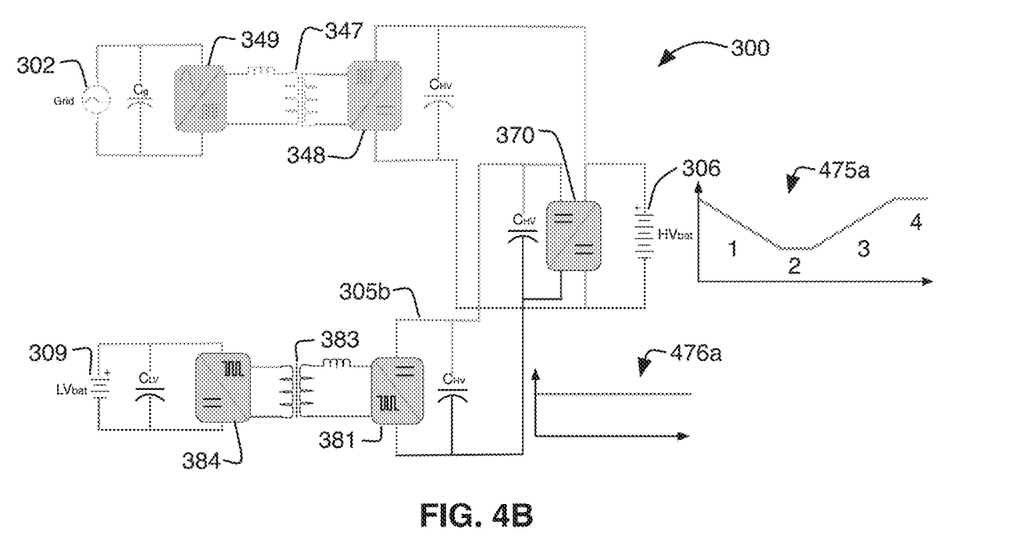
FIG. 4B illustrates operation of the high voltage battery system of FIG. 4A in a battery discharging mode.

FIG. 4B illustrates the high voltage battery system 300 (represented by the block diagram of FIG. 4A) operating in a first battery discharging mode. In this operating mode, AC grid 302 is disconnected. Converters 348 and 349 are not operating and are de-energized, as is transformer 347 are deenergized. DC bus 305a is supported by high voltage battery 306. As a result, as high voltage battery 306 discharges, the voltage appearing on high voltage bus 305a will decrease, as indicated by plot 475a, which illustrates the voltage of high voltage bus 305a versus time during a series of states: (1) during discharge (declining voltage), (2) an off time in which the battery is discharged, (3) a charging time (increasing portion), and finally (4) a time in which the battery is fully charged (level portion).

Also in this mode, active filter/DCDC converter 370 will be operating to provide a filtered/substantially constant DC voltage to bus 305b. The voltage across bus 305b is illustrated by plot 476a, which shows the filtered DC bus voltage as substantially constant over time. This substantially constant voltage may be achieved by varying the switching frequency and/or duty cycle as described above to provide suitable output voltage regulation. As a result of the substantially constant voltage appearing at the input of inverter 381, the efficiency of inverter 381 may be improved. In all other material respects, operation of the HVLV DCDC converter is as described above.

Figure 4C:
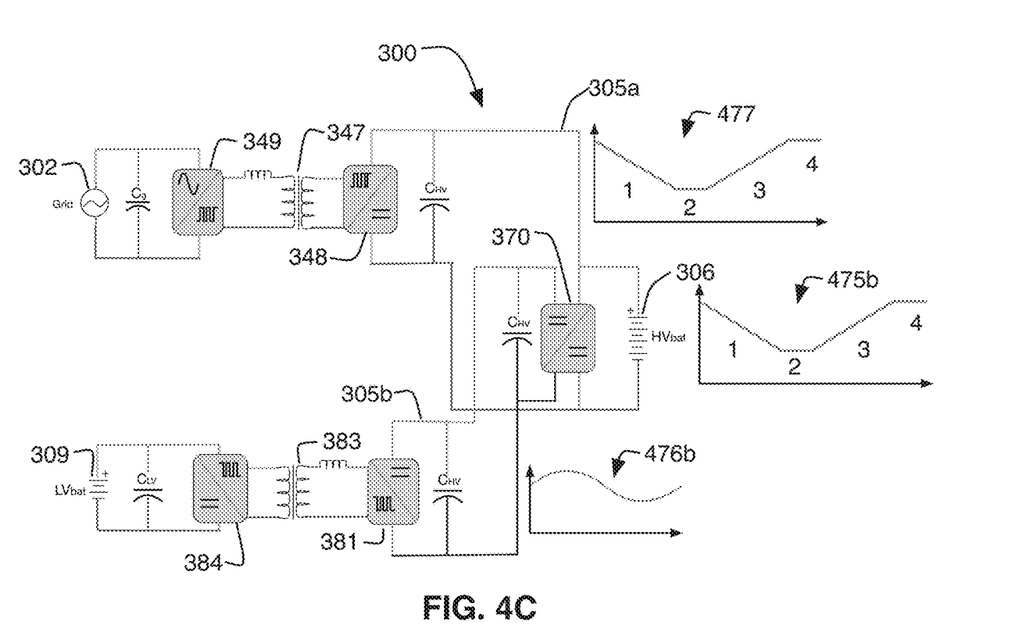
FIG. 4C illustrates operation of the high voltage battery system of FIG. 4A in a battery charging mode.

FIG. 4C illustrates the high voltage battery system 300 (represented by the block diagram of FIG. 4A) operating in a second mode corresponding to battery charging. In this mode, an AC power source, such as AC grid 302 provides power to the charger stage, including converters 349 and 348 and transformer 347, which are energized and operate as described above with respect to FIG. 3. This produces a controlled DC voltage on high voltage bus 305a that may be used to charge high voltage battery 306. The voltage on high voltage bus 305a is illustrated by voltage plot 477. In general, when high voltage battery 306 is in a discharged state (2), the voltage on high voltage bus 305a will be at a relatively lower level, increasing (3) as the battery is charged, to the fully charged battery voltage (4). The voltage of high voltage battery 306 will also correspond to the voltage of high voltage bus 305a, as illustrated by plot 475b. In this mode of operation, active filter 370 will operate as described above to produce the filtered high voltage appearing on filtered high voltage bus 305b. Operation of filter/converter 370 can reduce, but not entirely eliminate coupling of harmonics of the AC power frequency onto the bus, so there will still be some, although substantially reduced harmonics appearing at the input of the HVLV DCDC converter, as illustrated by the undulating voltage 476b of the filtered high voltage DC bus.

Figure 5:
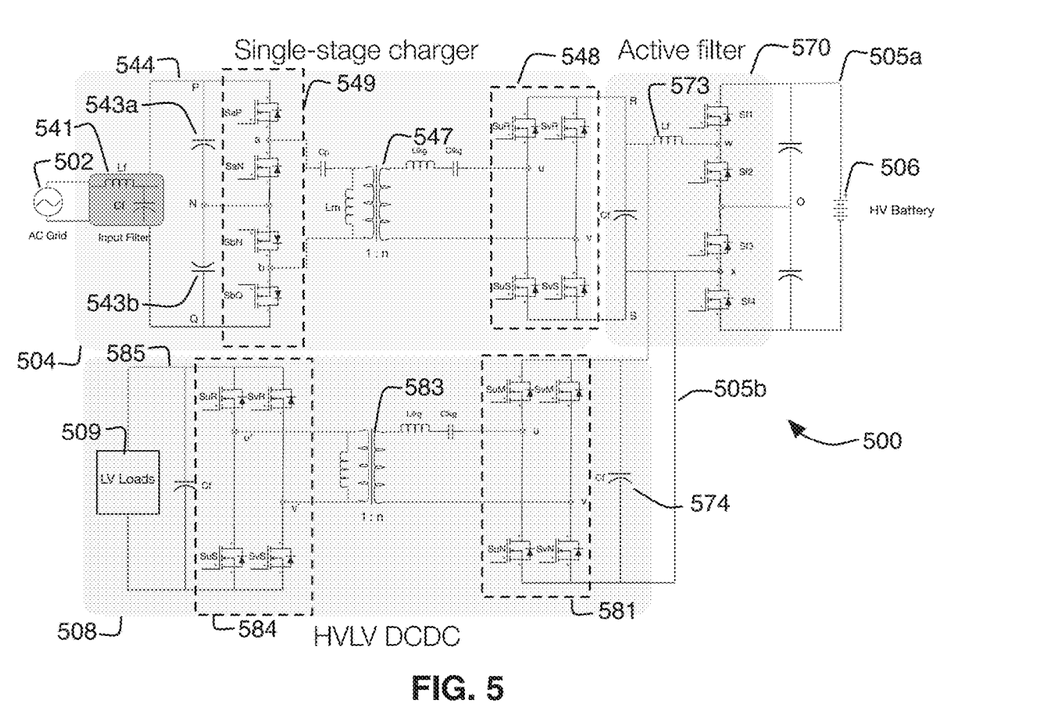
FIG. 5 illustrates a schematic of a second embodiment of a high voltage battery system that can receive power from an AC grid and deliver power to a low voltage battery system incorporating an integrated active filter and HVLV DCDC converter to reduce harmonics associated with the charger reaching the low voltage battery system.

FIG. 5 illustrates a schematic of a second embodiment of a high voltage battery system 500 that can receive power from an AC grid and deliver power to a low voltage battery system incorporating an integrated active filter and HVLV DCDC converter to reduce harmonics associated with the charger reaching the low voltage battery system. High voltage battery system 500 includes a single stage charger 504 that receives AC input power, for example from an AC grid 502 and converts it to a high voltage DC that is supplied via high voltage DC bus 505a to a high voltage battery 506. Also coupled to high voltage bus 505a is an active filter 570, described in greater detail below. The output of active filter 570 may be provided to HVLV DCDC 508, which converts the filtered high DC voltage into a lower DC voltage suitable for low voltage loads 509.

Returning to charger 504, and similar to the systems described above, an AC voltage from an AC power source, such as an AC grid 502 may be passed through an input filter 541. This filtered AC voltage may appear across an AC input bus 544 (corresponding to terminals P, Q, and N). AC input bus 544 may be supported by capacitors 543a and 543b. This filtered AC input bus 544 is also connected to the input of a switching bridge 549. In the illustrated embodiment, switching bridge 549 is a stacked half bridge made up of four switches SaP, SaN, SbN, and SbQ. However, other switching bridge configurations could be used. Likewise, as with all converters described herein, different types of semiconductor devices based on different semiconductor technologies may be used depending on the particular application. Operation of these switches selectively couples the AC voltage appearing at input terminals P, N, and Q to the output terminals a and b. Control of the switching frequency and/or duty cycle of these switches, using for example a pulse width modulation (PWM) control technique, can produce a controllable DC voltage at output terminals a and b. Switching bridge 549 may thus be operated to convert the filtered AC input voltage appearing across AC input bus 544 to an AC voltage having different voltage and/or frequency characteristics at the output of switching bridge 549, i.e., terminals a and b. This voltage may be provided to the primary winding of transformer 547, which may provide galvanic isolation between the AC input and the DC voltage bus, as well as providing a suitable step up or step down of the voltage, depending on the turns ratio of the transformer.

As a result, a transformed AC voltage appears across the secondary winding of transformer 547. This voltage may be provided to the input terminals (u, v) of switching bridge 548, which may act as a rectifier/charger to produce the high DC voltage that is provided to active filter 570 for production of high voltage DC busses 505a (for charging high voltage battery 506) and 505b (for conversion to low voltage for the low voltage system). In the illustrated embodiment, rectifier/charger 548 includes a stacked half bridge of switches SuR, SvR, SuS, and SvS. Operation of these switches selectively couples the AC voltage appearing at input terminals u and v to the output terminals R and S. Control of the switching frequency and/or duty cycle of these switches, using for example a pulse width modulation (PWM) control technique, can produce a controllable DC voltage at output terminals R and S. As with the other converter embodiments described herein, different topologies (e.g., bridge configurations), switching devices, and/or semiconductor technologies may be used as appropriate for a particular application.

The DC voltage appearing across terminals R and S) may be provided to active filter 570. Active filter 570 includes a stacked half bridge of switches Sf1, Sf2, Sf3, and Sf4 coupled to a filter circuit made up of inductor Lf, 573 and capacitor Cf, 574 (illustrated as two parallel capacitors). As with the embodiment discussed above, other filter circuit configurations could also be employed. Similarly, as with the other converters discussed herein, differing bridge configurations, switch types, and semiconductor technologies may be used as appropriate for a given application. The input of the switch bridge (terminals w and x) are coupled to output terminals R and S of rectifier charger 548 by the filter circuit. The outputs of the switch bridge may be coupled to high voltage bus 505a, which may be coupled to high voltage battery 506. Switches Sf1, Sf2, Sf3, and Sf4 may be operated to selectively couple high voltage bus 505a to the filter circuit. By controlling the switching frequency and duty cycle of these switches, a controlled and filtered DC voltage may be delivered to high voltage bus 505a as well as high voltage DC bus 505b, which is coupled to the input of HVLV DCDC converter 508.

HVLV DCDC converter 508 receives the filtered high voltage DC bus 505b and converts that high voltage to a low voltage suitable for low voltage loads 509. In the illustrated configuration, HVLV DCDC converter 508 may include inverter 581, illustrated as a full bridge inverter made up of switching devices SuM, SvM, SuN, and SvN, with the input terminals coupled across filtered high voltage bus 505b and the output terminals (u and v) coupled to the primary winding of transformer 583. These switching devices may be any suitable device type or semiconductor technology, as described above. Operation of these switches selectively couples the high voltage DC bus voltage on bus 505b to output terminals u and v. Control of the switching frequency and/or duty cycle of these switches, using for example a pulse width modulation (PWM) control technique, can produce an AC voltage having desired voltage and frequency characteristics at output terminals u and v. Inverter 581 may be thus operated to convert the filtered high voltage DC bus voltage 505b into an AC voltage with voltage and frequency suitable for input into transformer 583.

As above, transformer 583 may serve to provide galvanic isolation between high voltage bus 505b and the low voltage battery system. Additionally, transformer may provide a desired degree of voltage conversion (e.g., step-down), depending on the turns ratio of the transformer. The voltage appearing at the secondary winding of transformer 583 may be coupled to the input terminals (u' and v') of rectifier/regulator 584. Rectifier/regulator 584 may be a full bridge made up of switching devices SuR, SuS, SvR, and SvS. These switching devices may be any suitable device type or semiconductor technology, as described above. Operation of these switches selectively couples the AC voltage appearing at input terminals u' and v' to the output terminals coupled to low voltage DC bus 585. Control of the switching frequency and/or duty cycle of these switches, using for example a pulse width modulation (PWM) control technique, can produce a controllable DC voltage on the low voltage DC bus. Rectifier/regulator 584 may thus be operated to convert the AC voltage appearing at the secondary of transformer 583 into a DC voltage suitable for low voltage DC bus 585, which may power one or more low voltage loads 509, including charging a low voltage battery.

Figure 6A:
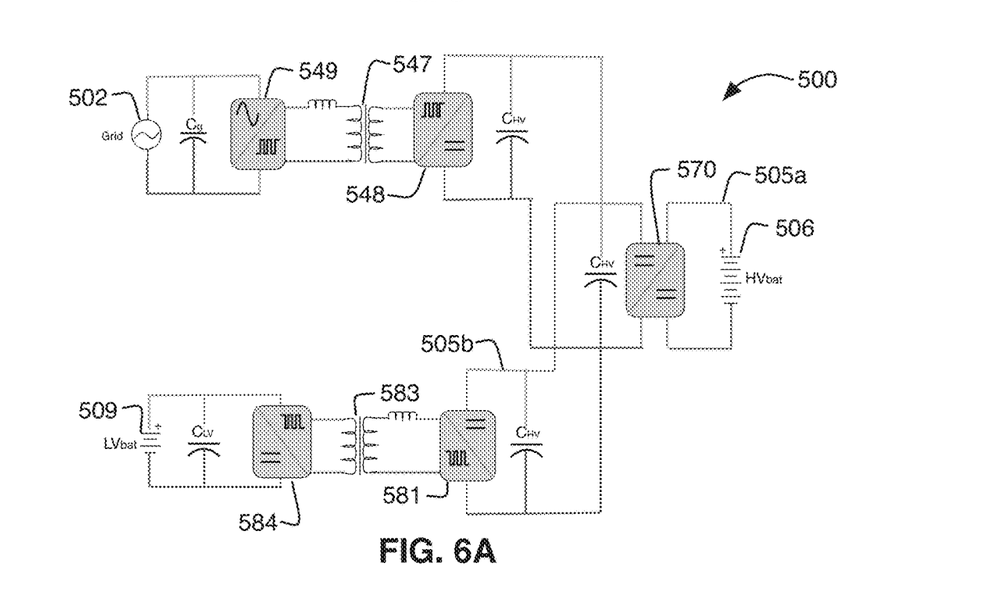
FIG. 6A illustrates a block diagram of the high voltage battery system of FIG. 5.

FIG. 6A illustrates a block diagram of the high voltage battery system 500 described above with respect to FIG. 5. Each of the converters/switching bridges has been replaced with a correspondingly numbered functional block. Notably, active filter 570 is denoted as a DC-DC converter. In all material respects, the connections and operation are as described above with respect to FIG. 5.

Figure 6B:
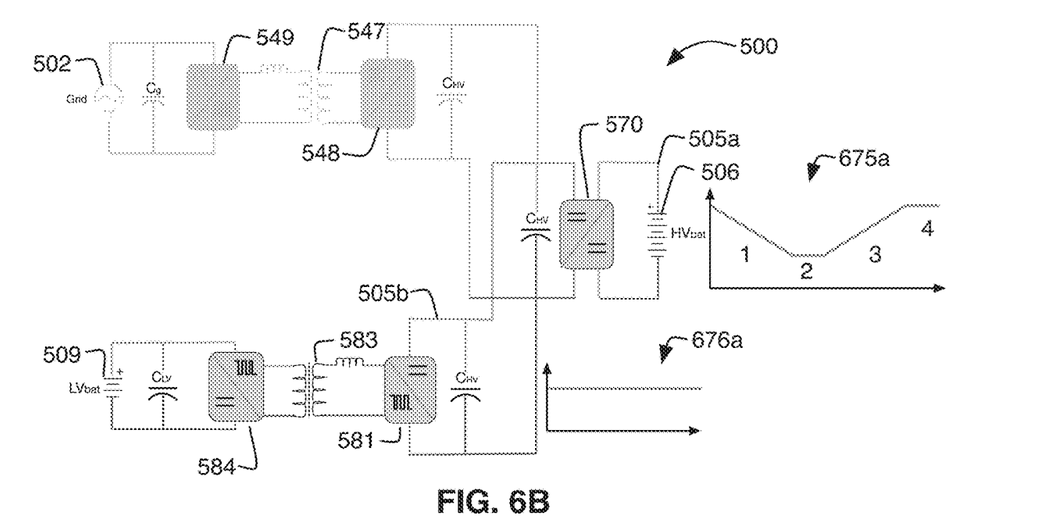
FIG. 6B illustrates operation of the high voltage battery system of FIG. 6A in a battery discharging mode.

FIG. 6B illustrates the high voltage battery system 500 (represented by the block diagram of FIG. 6A) operating in a first battery discharging mode. In this operating mode, AC grid 502 is disconnected. Converters 548 and 549 are not operating and are de-energized, as is transformer 547 are deenergized. DC bus 505a is supported by high voltage battery 506. As a result, as high voltage battery 506 discharges, the voltage appearing on high voltage bus 505a will decrease, as indicated by plot 675a, which illustrates the voltage of high voltage bus 505a versus time during a series of states: (1) during discharge (declining voltage), (2) an off time in which the battery is discharged, (3) a charging time (increasing portion), and finally (4) a time in which the battery is fully charged (level portion).

Also in this mode, active filter/DCDC converter 570 will be operating to provide a filtered/substantially constant DC voltage to bus 505b, with the energy being supplied by high voltage battery 306 via high voltage bus 305a. The voltage across bus 505b is illustrated by plot 676a, which shows the filtered DC bus voltage as substantially constant over time. This substantially constant voltage may be achieved by varying the switching frequency and/or duty cycle as described above to provide suitable output voltage regulation. As a result of the substantially constant voltage appearing at the input of inverter 581, the efficiency of inverter 581 may be improved. In all other material respects, operation of the HVLV DCDC converter is as described above.

Figure 6C:
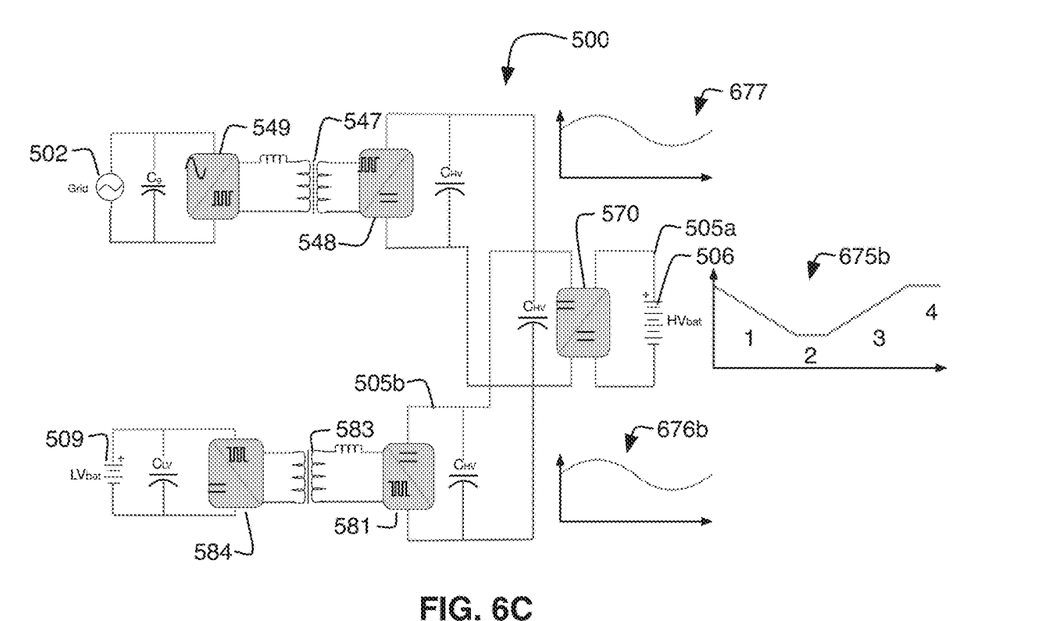
FIG. 6C illustrates operation of the high voltage battery system of FIG. 6A in a battery charging mode.

FIG. 6C illustrates the high voltage battery system 500 (represented by the block diagram of FIG. 6A) operating in a second mode corresponding to battery charging. In this mode, an AC power source, such as AC grid 502 provides power to the charger stage, including converters 549 and 548 and transformer 547, which are energized and operate as described above with respect to FIG. 5. This produces a controlled DC voltage that may be provided to active filter/DCDC converter 570, which in turns produces high voltage bus 505a that may be used to charge high voltage battery 506. The voltage produced by converter 548 is illustrated by voltage plot 677, which includes harmonic components of the AC grid voltage and thus has the illustrated sinusoidal form. Also illustrated is the voltage appearing on DC bus 505a (and supplied to high voltage battery 506) by active filter 570. In general, when high voltage battery 506 is in a discharged state (2), the voltage on high voltage bus 505a will be at a relatively lower level, increasing (3) as the battery is charged, to the fully charged battery voltage (4). The voltage of high voltage battery 506 will also correspond to the voltage of high voltage bus 305a. In this mode of operation, active filter 570 will operate as described above to produce the high voltage appearing on high voltage bus 505b. Operation of filter/converter 570 can reduce, but not entirely eliminate coupling of harmonics of the AC power frequency onto the bus, so there will still be some, although substantially reduced harmonics appearing at the input of the HVLV DCDC converter, as illustrated by the undulating voltage 676b of the filtered high voltage DC bus.

The foregoing describes exemplary embodiments of high voltage battery systems that can receive power from an AC grid and deliver power to a low voltage battery system incorporating an integrated active filter and HVLV DCDC converter to reduce harmonics associated with the charger reaching the low voltage battery system. Such systems may be used in a variety of applications but may be particularly advantageous when used in conjunction with Such systems may be used in a variety of applications but may be particularly advantageous when used in conjunction with relatively high voltage and/or high power systems, such as may be used in electric vehicles, grid storage batteries, photovoltaic systems, and the like. Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A high voltage battery system comprising:
  a charger circuit comprising:
    a first input switching bridge having an input and an output, the input configured to be coupled to an AC input source, the first input switching bridge being further configured to convert an AC input voltage to an AC voltage having a selected voltage and frequency;
    a first transformer having a primary winding coupled to the output of the input switching bridge and a secondary winding; and
    a first rectifier charger circuit having an input coupled to the secondary winding of the first transformer and an output coupled to a high voltage DC bus;
  a high voltage battery coupled to an output of the charger circuit;
  an active filter circuit comprising a filter switching bridge and a filter circuit, having an input coupled to the output of the charger circuit and an output, the active filter circuit being operable to reduce harmonics associated with operation of the charger circuit and to provide a filtered DC voltage output; and
  a high voltage to low voltage DC-DC converter circuit comprising:
    an inverter having an input configured to be coupled to the output of the active filter circuit and an output, the inverter being further configured to convert a received filtered high DC voltage to an AC voltage having a selected voltage and frequency;
    a second transformer having a primary winding coupled to the output of the inverter and a secondary winding; and
    a second rectifier charger circuit having an input coupled to the secondary winding of the second transformer and an output coupled to a low voltage DC bus and being configured to produce a low DC voltage for the low voltage DC bus.

2. The high voltage battery system of claim 1 wherein at least one of the first switching bridge and the first rectifier charger circuit comprise a stacked half bridge.

3. The high voltage battery system of claim 1 wherein the filter switching bridge comprises a stacked half bridge.

4. The high voltage battery system of claim 1 wherein the filter circuit is a second order low pass filter.

5. A high voltage battery system comprising:
  a charger circuit comprising:
    a first input switching bridge having an input and an output, the input configured to be coupled to an AC input source, the first input switching bridge being further configured to convert an AC input voltage to an AC voltage having a selected voltage and frequency;
    a first transformer having a primary winding coupled to the output of the input switching bridge and a secondary winding; and
    a first rectifier charger circuit having an input coupled to the secondary winding of the first transformer and an output coupled to a high voltage DC bus;
  an active filter circuit comprising a filter switching bridge and a filter circuit, the active filter circuit having an input coupled to the output of the charger circuit and an output coupled to the high voltage DC bus, wherein the active filter circuit is operable to reduce harmonics associated with operation of the charger circuit and to provide a filtered DC voltage output;
  a high voltage battery coupled to the high voltage DC bus; and
  a high voltage to low voltage DC-DC converter circuit comprising:
    an inverter coupled to the active filter circuit and an output, the inverter being further configured to convert a high DC voltage to an AC voltage having a selected voltage and frequency;
    a second transformer having a primary winding coupled to the output of the inverter and a secondary winding; and
    a second rectifier charger circuit having an input coupled to the secondary winding of the second transformer and an output coupled to a low voltage DC bus and being configured to produce a low DC voltage for the low DC voltage bus.

6. The high voltage battery system of claim 5 wherein at least one of the first switching bridge and the first rectifier charger circuit comprise a stacked half bridge.

7. The high voltage battery system of claim 5 wherein the filter switching bridge comprises a stacked half bridge.

8. The high voltage battery system of claim 5 wherein the filter circuit is a second order low pass filter.

9. A high voltage battery system comprising:
  a charger circuit having an input configured to receive power from an AC input source and an output coupled to a high voltage DC bus configured to provide output DC power to a high voltage battery, wherein one or more switching converters of the charger circuit are operable to convert the received power into the output DC power;
  an active filter circuit having an input coupled to the output of the charger circuit and an output, wherein the active filter circuit is operable to reduce harmonics associated with operation of the charger circuit and to provide a filtered DC voltage output; and
  a high voltage to low voltage DC-DC converter circuit having an input coupled to the output of the active filter circuit and an output configured to be coupled to one or more low voltage loads, wherein the high voltage to low voltage DC-DC converter is operable to convert a filtered DC voltage received from the active filter to a lower DC voltage provided to a low voltage DC bus.

10. The high voltage battery system of claim 9 wherein the charger circuit comprises:
  a first input switching bridge having an input configured to be coupled to the AC input source and an output, the first input switching bridge being further configured to convert the received power to an AC voltage having a selected voltage and frequency;

a first transformer having a primary winding coupled to the output of the input switching bridge and a secondary winding; and a first rectifier charger circuit having an input coupled to the secondary winding of the first transformer and an output coupled to the high voltage DC bus.

11. The high voltage battery system of claim 10 wherein at least one of the first input switching bridge and the first rectifier charger circuit comprise a stacked half bridge.

12. The high voltage battery system of claim 9 wherein the active filter circuit comprises a filter switching bridge and a filter circuit.

13. The high voltage battery system of claim 12 wherein the filter switching bridge comprises a stacked half bridge.

14. The high voltage battery system of claim 12 wherein the filter circuit is a second order low pass filter.

15. The high voltage battery system of claim 9 wherein the high voltage to low voltage DC-DC converter circuit comprises:

an inverter having an input configured to be coupled to the output of the active filter circuit and an output, the inverter being further configured to convert a received filtered high DC voltage to an AC voltage having a selected voltage and frequency;

a second transformer having a primary winding coupled to the output of the inverter and a secondary winding; and a second rectifier charger circuit having an input coupled to the secondary winding of the second transformer and an output coupled to the low voltage DC bus.

16. A high voltage battery system comprising:

a charger circuit having an input configured to receive power from an AC input source and an output, wherein one or more switching converters of the charger circuit are operable to convert the received power into output DC power;

an active filter circuit having an input coupled to the output of the charger circuit and an output, wherein the active filter circuit is operable to reduce harmonics associated with operation of the charger circuit and to provide a filtered DC voltage output and wherein an output of the active filter circuit is coupled to a high voltage DC bus configured to provide output DC power to a high voltage battery; and a high voltage to low voltage DC-DC converter circuit having an input coupled to the active filter circuit and an output configured to be coupled to one or more low voltage loads, wherein the high voltage to low voltage DC-DC converter is operable to convert a DC voltage to a lower DC voltage provided to a low voltage DC bus.

17. The high voltage battery system of claim 16 wherein the charger circuit comprises:

a first input switching bridge having an input configured to be coupled to the AC input source and an output, the first input switching bridge being further configured to convert the received power to an AC voltage having a selected voltage and frequency;

a first transformer having a primary winding coupled to the output of the input switching bridge and a secondary winding; and a first rectifier charger circuit having an input coupled to the secondary winding of the first transformer and an output coupled to the high voltage DC bus.

18. The high voltage battery system of claim 17 wherein at least one of the first input switching bridge and the first rectifier charger circuit comprise a stacked half bridge.

19. The high voltage battery system of claim 16 wherein the active filter circuit comprises a filter switching bridge and a filter circuit.

20. The high voltage battery system of claim 19 wherein the filter switching bridge comprises a stacked half bridge.

21. The high voltage battery system of claim 19 wherein the filter circuit is a second order low pass filter.

22. The high voltage battery system of claim 16 wherein the high voltage to low voltage DC-DC converter circuit comprises:

an inverter having an input configured to be coupled to the active filter circuit and an output, the inverter being further configured to convert a received DC voltage to an AC voltage having a selected voltage and frequency;

a second transformer having a primary winding coupled to the output of the inverter and a secondary winding; and a second rectifier charger circuit having an input coupled to the secondary winding of the second transformer and an output coupled to the low voltage DC bus.

* * * * *